Feb. 19, 1935.  J. P. KRIECHBAUM  1,991,807
CONTROL SYSTEM FOR PLURAL VALVES
Filed May 5, 1934
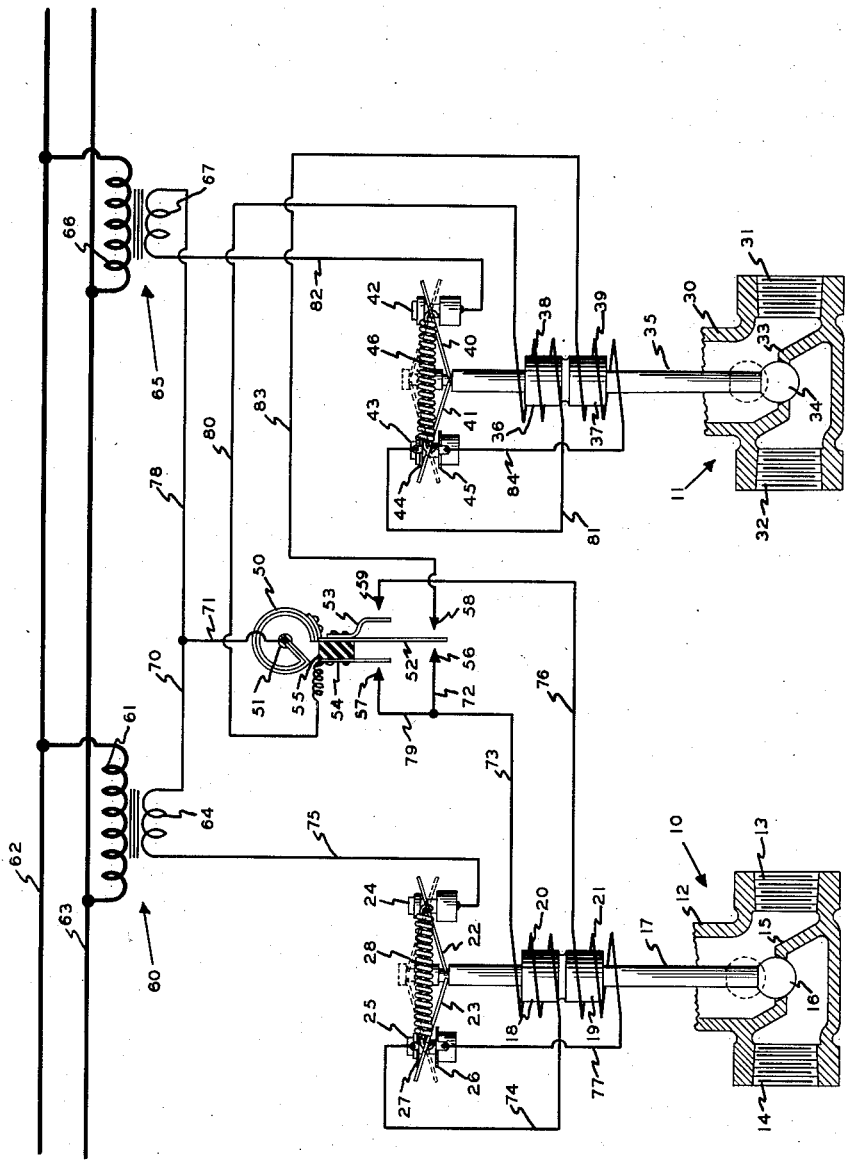
Inventor
John P. Kriechbaum
By George H. Fisher
Attorney Patented Feb. 19, 1935

1,991,807

UNITED STATES PATENT OFFICE 1,991,807

CONTROL SYSTEM FOR PLURAL VALVES

John P. Kriechbaum, Minneapolis, Minn., assignor to Minneapolis-Honeywell Regulator Company, Minneapolis, Minn., a corporation of Delaware Application May 5, 1934, Serial No. 724,147

8 Claims. (Cl. 236—75)

The present invention relates to the control of a plurality of control devices, such as a plurality of electrically operated valves, by a single movable member which is preferably moved in response to changes in a condition or force, the arrangement being such that the various valves are opened and closed at different positions of the movable member.

One of the objects of the present invention is the provision of a control system by which a first control device is moved to a new position when movable member reaches a first point in its path of travel, a second control device is moved to a new control position when the movable member reaches a second point in its path of travel upon continued travel in the same direction and in which the control devices are sequentially returned to their original positions upon return movement of the movable member to third and fourth positions which are reached upon return movement of movable member only after the same has moved past said first point.

A further object of the invention is the provision of a control system for a pair of control devices each of which is operated by two electrical mechanisms, such as a pair of electromagnetic coils, the control system including four switches operated by a single control element to sequentially close two of the switches upon movement of the control element in one direction and to sequentially close the other two switches upon return movement of the control element after the first two switches have opened, the arrangement being such that each switch controls one of the four electromagnetic coils comprised by the two pairs of operating devices for each control device.

Other objects of the invention reside in the detailed arrangement of the parts as well as the details of the circuit connections.

Other objects of the invention will be found in the following detailed description, the accompanying drawing and the appended claims.

For a better understanding of the invention, reference may be had to the following description and the accompanying single drawing which is a diagrammatic showing of the preferred form of the present invention.

Referring to the single drawing, a pair of control devices in the form of electrically operated valves are generally designated at 10 and 11. The valve 10 comprises a valve casing 12, having the usual inlet 13 and outlet 14 with a partition wall 15 therebetween which is provided with the usual valve opening. The valve opening is adapted to be controlled by a valve closure member in the form of a ball 16 which is secured to one end of a valve stem 17. Valve stem 17 carries a pair of armatures 18 and 19 that are adapted to be respectively operated by an electromagnetic opening coil 20 and an electromagnetic closing coil 21. The upper end of valve stem 17 pivotally supports a pair of toggle arms 22 and 23 which act both as toggle arms and as current carrying members. The toggle arm 22 cooperates with a double-stop member 24 which also acts as a single contact and the toggle arm 23 cooperates with a double-stop member 25 which includes a pair of contacts 26 and 27 that are electrically insulated one from the other. The usual tension spring 28 completes the toggle mechanism.

Valve 11 similarly comprises a casing 30 having an inlet opening 31 and an outlet opening 32 with a partition wall 33 therebetween which is provided with the usual valve opening. The valve closure member of spherical formation is indicated at 34 and is carried by a valve stem 35 which supports a pair of armatures 36 and 37. Armatures 36 and 37 cooperate with an electromagnetic opening coil 38 and an electromagnetic closing valve 39. The combination toggle and switching mechanism of valve 11 comprises toggle arms 40 and 41, toggle arm 40 cooperating with a double-stop member 42 which also acts as a single contact and toggle arm 41 cooperating with a stop member 43 which is provided with electrical contacts 44 and 45. The toggle spring is indicated at 46.

It will be noted that both the valves 10 and 11 are identical in construction and for further details of such valves reference may be had to George D. Bower Patent No. 1,861,046, which issued May 31, 1932. As explained in said Bower Patent No. 1,861,046, and having particular reference to the valve 10, upon energization of the opening electromagnetic coil 20, the valve stem 17 is raised and when the toggle arms 22 and 23 pass through the axis of spring 28, the valve stem is snapped to the dotted position shown in the drawing. During this operation, arm 23 is moved from engagement with the contact 27 and into engagement with the contact 26. Upon subsequent energization of electromagnetic coil 21, the valve stem is moved downwardly and when the toggle arms 22 and 23 again pass through the axis of spring 28, the valve stem 17 is snapped to the full-line position shown in the drawing wherein flow of fluid through the casing 12 is prevented. It will be noted that the contacts 26 and 27, together with the toggle arms 23 and 22 and the stop member 24 comprise a double circuit switching mechanism. Valve 11 operates in the same manner.

The valves 10 and 11 are herein shown as controlled by a movable member or apparatus comprising a bimetallic element 50 having one of its ends held relatively stationary as by a post 51. The other end of bimetallic element 50 carries a movable member comprising contact arms 52 and 53. An arm 54 is also operated by bimetallic element 50 and is secured to contact arm 52 through an insulating block 55 whereby arm 54 is electrically disconnected from contact arms 52 and 53 and the bimetallic element 50. Upon fall in temperature, the bimetallic element 50 first moves contact arm 52 into engagement with a contact 56 and upon continued temperature fall the arm 54 is moved into engagement with a contact 57. Upon a temperature rise, arm 54 first disengages contact 57 and thereafter contact arm 52 disengages contact 56. If the temperature continues to rise, contact arm 52 engages a contact 58 and upon still further temperature rise, contact arm 53 engages a contact 59. While the movable member or actuator has herein been shown as responsive to temperature, it will be apparent that it could be operated in many other manners and particularly in response to changes in any desired condition.

Electrical power for operating valve 10 is supplied by a step-down transformer 60 which includes a high voltage primary 61, that is connected to suitable line wires 62 and 63, and a low voltage secondary 64. Similarly, electrical power is supplied to valve 11 by a step-down transformer 65 which includes a high voltage primary 66 also connected to line wires 62 and 63 and a low voltage secondary 67. It should be noted that the valves 10 and 11 are commercial valves readily obtainable on the market and the two transformers 60 and 65 are built particularly for use with such valves and while each of the transformers has sufficient capacity to operate one of the valves neither could safely operate both valves 10 and 11. The remaining circuit connections will be described in detail under the heading "Operation".

The valves 10 and 11 herein shown are merely exemplary of any desired type of control device and they may well control the supply of fuel, such as gas, to a single gas burner or to a pair of gas burners which either heat a single furnace or separate furnaces.

Operation

With the parts in the position shown, the temperature to which bimetallic element 50 responds is intermediate so that none of the contacts 56 to 59 inclusive is engaged by its cooperating contact arm, valves 10 and 11 are both closed and, in the event these valves are in the control of the supply of fuel to a heater which heats the room or space the temperature of which effects bimetallic element 50, it will be apparent that shortly the temperature therein will begin to fall. Upon a first fall in temperature, bimetallic element 50 moves contact arm 52 into engagement with contact 56 as heretofore explained and thereby establishes an energizing circuit for electromagnetic opening coil 20 of valve 10 as follows: secondary 64, wire 70, wire 71, bimetallic element 50, contact arm 52, contact 56, wire 72, wire 73, electromagnetic opening coil 20, wire 74, contact 27, toggle arms 23 and 22, contact 24 and wire 75 to the other side of secondary 64. The valve 10 is therefore moved to open position in the manner heretofore described and toggle arm 23 snaps from engagement with contact 27 and into engagement with contact 26. Disengagement of toggle arm 23 from contact 27 interrupts this energizing circuit for electromagnetic opening coil 20 and engagement of toggle arm 23 with contact 26 conditions an energizing circuit for electromagnetic closing coil 21 which is completed in a manner to be hereinafter explained. The valve 10 is now maintained open by its toggle mechanism. Opening of valve 10 allows a small amount of fuel or other fluid to flow through the casing 12 and out of outlet 14. Now if the temperature to which bimetallic element 50 is restored, contact arm 52 will move from engagement with contact 56. If the temperature continues to rise, contact arm 52 will engage contact 58 but such engagement will not complete any energizing circuits at this time since toggle arm 41 is disengaged from contact 45. However, upon continued temperature rise, contact arm 53 will engage contact 59 to establish an energizing circuit for electromagnetic closing coil 21 as follows: secondary 64, wire 70, wire 71, bimetallic element 50, contact arm 53, contact 59, wire 76, electromagnetic closing coil 21, wire 77, contact 26, toggle arm 23, toggle arm 22, contact 24 and wire 75 to the other side of secondary 64. Valve 10 is therefore closed and the toggle arms return to the position shown in the drawing wherein toggle arm 23 is disengaged from contact 26, whereby the energizing circuit for electromagnetic closing coil 21 is interrupted, and is in engagement with contact 27 so as to recondition the electromagnetic opening coil 20 for energization.

In the event the temperature continues to fall after valve 10 has been opened by reason of engagement of contact arm 52 with contact 56 so as to bring arm 54 into engagement with contact 57 then, in that event, an energizing circuit for electromagnetic opening coil 38 of valve 11 will be established as follows: secondary 67 of transformer 65, wire 78, wire 71, bimetallic element 50, contact arm 52, contact 56, wire 72, wire 79, contact 57, arm 54, wire 80, electromagnetic opening coil 38, wire 81, contact 44, toggle arm 40, contact 42 and wire 82 to the other side of secondary 67. Valve 11 will therefore be opened and the parts moved to the dotted position shown in the drawing. Movement of toggle arm 41 from engagement with contact 44 interrupts the energizing circuit for electromagnetic opening coil 38 and its engagement with contact 45 conditions an energizing circuit for electromagnetic closing coil 39 when the temperature has been restored. Now after the temperature is restored, arm 54 will first disengage contact 57 but the valve 11 will remain open. Upon continued rise in temperature, contact arm 52 will disengage contact 56 but valve 10 will also remain open. Thereafter, upon continued temperature rise, contact arm 52 will move into engagement with contact 58, whereupon an energizing circuit for electromagnetic closing coil 39 of valve 11 is established as follows: secondary 67 of transformer 65, wire 78, wire 71, bimetallic element 50, contact arm 52, contact 58, wire 83, electromagnetic closing coil 39, wire 84, contact 45, toggle arms 41 and 40, contact 42 and wire 82 to the other side of secondary 67. Valve 11 is thereupon closed and its parts return to the position shown in the drawing wherein toggle arm 41 is engaged with contact 44. The energizing circuit for electromagnetic closing coil 39 is thereby interrupted and the energizing circuit for electromagnetic opening coil 38 is again conditioned for energization. If the temperature continues to rise until contact arm 53 engages contact 59 then the valve 10 will also be closed in the manner heretofore explained.

From the foregoing description, it will be seen that the present invention provides a simple system by which a movable member which controls three contact arms that are cooperable with four contacts control a pair of control devices each of which is operated by two electrical devices, the arrangement being such that each control device is moved to its two control positions at different positions of the controlling contact arms and further that one of the control devices is operated at different positions of the controlling contact arms than is the other controlling device. The invention provides a simple arrangement by which these operations can be accomplished with the minimum number of contacts and cooperating contacting arms and with the minimum number of circuit connections.

A specific embodiment of the invention has been herein shown and disclosed but it will be apparent that changes may be made therein by those skilled in the art and I therefore intend to be limited only by the scope of the appended claims.

I claim:

1. In combination, a first valve, a second valve, a member movable back and forth along a predetermined path of travel in response to changes in a condition, connections between said movable member and first valve for opening the same when said movable member reaches a first point in its path of travel when moving in one direction and for closing the same when the movable member reaches a second point in its path of travel while moving in the opposite direction, and connections between said movable member and second valve for opening the second valve when the movable member reaches a third point in its path of travel while moving in said first direction and for closing the same when the movable member reaches a fourth point in its path of travel while moving in said opposite direction, said third and fourth points lying upon opposite sides of said first point with said fourth point lying between said first and second points.

2. In combination, a first valve, a pair of electrically energizable devices for respectively opening and closing the same, a second valve, a second pair of electrically energizable devices for respectively opening and closing the second valve, a movable member, first and second switches sequentially closed thereby upon movement of said movable member in one direction, third and fourth switches sequentially closed thereby upon movement of said movable member in the opposite direction past the point at which said first switch closes, an energizing circuit for the first valve opening device controlled by said first switch, an energizing circuit for said second valve opening device controlled by said second switch, and energizing circuits for said valve closing devices controlled by said third and fourth switches.

3. In combination, a first valve, separate electromagnetic opening and closing coils therefor, a second valve, second separate electromagnetic opening and closing coils for the second valve, a movable member, first and second switches sequentially closed thereby upon movement in one direction, energizing circuits for said first and second electromagnetic opening coils controlled by said first and second switches respectively, third and fourth switches sequentially moved to closed position by said movable member upon movement thereof in the opposite direction past the point at which said first switch opens, and energizing circuits for said electromagnetic closing coils controlled by said third and fourth switches.

4. In combination, a first valve, separate electromagnetic opening and closing coils therefor, a second valve, second separate electromagnetic opening and closing coils for the second valve, a movable member, first and second switches sequentially closed thereby upon movement in one direction, energizing circuits for said first and second electromagnetic opening coils controlled by said first and second switches respectively, third and fourth switches sequentially moved to closed position by said movable member upon movement thereof in the opposite direction past the point at which said first switch opens, an energizing circuit for said second electromagnetic closing coil controlled by said third switch and an energizing circuit for said first electromagnetic closing coil controlled by said fourth switch.

5. In combination, a first valve having electromagnetic opening and closing coils, a second valve having electromagnetic opening and closing coils, a movable member, an arm carried thereby but electrically insulated therefrom, a first contact adapted to be engaged by said movable member upon movement in a first direction, a second contact adapted to be engaged by said arm upon further movement of said movable member in said first direction, energizing circuits for said first and second electromagnetic opening coils controlled by said first and second contacts and said movable member and said arm, third and fourth contacts adapted to be sequentially engaged by said movable member upon movement thereof in a second direction past the point at which said first contact is disengaged, and energizing circuits for said electromagnetic closing coils controlled by said third and fourth contacts and said movable member.

6. A temperature control system, comprising, in combination, a bimetallic element having one of its ends relatively fixed, a movable member secured to the free end thereof, an arm also secured to the free end thereof but electrically insulated from said movable member, a first contact adapted to be engaged by said movable member upon movement in a first direction, a second contact adapted to be engaged by said arm upon continued movement of said movable member in the same direction, a first temperature control device, a pair of electromagnetic operating coils therefor, a second temperature control device, a pair of electromagnetic operating coils therefor, energizing cricuits for one of each of said pair of operating coils controlled by said first and second contacts, third and fourth contacts sequentially engaged by said movable member upon movement in a second direction past the point at which the movable member disengages said first contact, and energizing circuits for the other of said operating coils of each pair controlled by said third and fourth contacts.

7. In combination, a member movable in response to changes in a condition, a first contact engaged thereby upon movement in a first direction, an arm controlled by said movable member but electrically insulated therefrom, a second contact engaged by said arm upon further movement of said movable member in the same direction, third and fourth contacts sequentially engaged by said movable member upon movement of said movable member in a second direction past the point at which the movable member disengages said first contact, a first control device, a pair of electromagnetic coils in control thereof, two position switching mechanism controlled by said first control device, an energizing circuit for one of said coils including said movable member, first contact and two position switching mechanism, an energizing circuit for the other of said coils controlled by said movable member, fourth contact and two position switching mechanism, a second control device, a second pair of electromagnetic coils in control thereof, a second two position switch controlled by said second control device, an energizing circuit for one of said second pair of electromagnetic coils controlled by said second contact, said arm, and said second two-position switch, and an energizing circuit for the other of said second pair of electromagnetic coils controlled by said movable member, third contact and second two-position switch.

8. In combination, a member movable in response to changes in a condition, a first contact engaged thereby upon movement in a first direction, an arm controlled by said movable member but electrically insulated therefrom, a second contact engaged by said arm upon further movement of said movable member in the same direction, third and fourth contacts sequentially engaged by said movable member upon movement of said movable member in a second direction past the point at which the movable member disengages said first contact, a first valve, opening and closing electromagnetic coils therefor, a first step-down transformer, a switch-arm connected to one side of the secondary thereof, a pair of contacts connected each to one end of said electromagnetic coils, mechanical connections between said switch-arm and valve, a conductor connecting the other side of the secondary of said transformer to said movable member, connections between the other ends of said opening and closing coils and said first and fourth contacts respectively, a second step-down transformer, a second valve, opening and closing electromagnetic coils therefor, a pair of contacts connected each to one end of said last-named coils, a cooperating switch arm electrically connected to one side of the secondary of said second transformer, mechanical connections between said second valve and cooperating switch arm, a conductor connecting said movable member to the other side of the secondary of said second transformer, conductors respectively connecting said arm and third contact to the other ends of said last-named opening and closing coils, and an electrical connection between said first and second contacts.

JOHN P. KRIECHBAUM.